United States Patent [19]

Working

[11] Patent Number: 5,213,843
[45] Date of Patent: May 25, 1993

[54] VACUUM POWDER INJECTOR AND METHOD OF IMPREGNATING FIBER WITH POWDER

[75] Inventor: Dennis C. Working, Norfolk, Va.

[73] Assignee: The United States of America as represented by the Administrator of the National Aeronautics and Space Administration, Washington, D.C.

[21] Appl. No.: 740,526

[22] Filed: Aug. 5, 1991

[51] Int. Cl.⁵ .............................................. B05D 1/12
[52] U.S. Cl. ................................... 427/180; 427/195; 427/294; 427/295; 427/296; 118/308; 118/325; 118/326; 156/180; 156/441; 428/396
[58] Field of Search ............... 427/180, 185, 195, 294, 427/295, 296; 118/308, 325, 326, DIG. 22; 156/166, 180, 441; 264/136, 137; 57/295, 297; 428/375, 378, 377, 396

[56] References Cited

U.S. PATENT DOCUMENTS

| | | | |
|---|---|---|---|
| 4,205,515 | 6/1980 | Garner | 427/185 |
| 4,211,818 | 7/1980 | Ackley | 428/367 |
| 4,455,326 | 6/1984 | Garner | 427/195 |
| 4,735,858 | 4/1988 | Hosokawa et al. | 428/390 |
| 5,057,338 | 10/1991 | Baucom et al. | 427/195 |
| 5,094,883 | 3/1992 | Muzzy et al. | 427/195 |

FOREIGN PATENT DOCUMENTS 1259085  1/1972  United Kingdom ................ 427/185

*Primary Examiner*—Terry J. Owens
*Attorney, Agent, or Firm*—George F. Helfrich

[57] ABSTRACT

A method and apparatus uniformly impregnate stranded material with dry powder such as low solubility, high melt flow polymer powder to produce, for example, composite prepregs. The stranded material is expanded in an impregnation chamber by an influx of air so that the powder, which may enter through the same inlet as the air, penetrates to the center of the stranded material. The stranded material then is contracted for holding the powder therein. The stranded material and powder may be pulled through the impregnation chamber in the same direction by vacuum. Larger particles of powder which do not fully penetrate the stranded material may be combed into the stranded material and powder which does not impregnate the stranded material may be collected and reused.

15 Claims, 1 Drawing Sheet

VACUUM POWDER INJECTOR AND METHOD OF IMPREGNATING FIBER WITH POWDER

ORIGIN OF THE INVENTION

The invention described herein was made by employees of the U.S. government and may be manufactured and used by or for the government without the payment of any royalties thereon or therefor.

BACKGROUND OF THE INVENTION

1. Field of the Invention

The present invention is directed to an apparatus and method for impregnating fiber bundles with powder materials. The method and apparatus are especially useful for providing uniform impregnation of carbon fiber tow bundles with low solubility, high melt flow polymer powder materials to produce composite prepregs. Improved materials such as high temperature and high modulus reinforced thermoplastics may be obtained by the method and apparatus of the invention.

2. Description of the Related Art

Impregnation of materials, for example for the production of prepregs, has been accomplished by solvent, slurry and film coating techniques. These techniques require the removal of solvents and/or carrier materials or require melt infusion of film into the material to produce prepregs. The removal of solvents and carrier materials to acceptable levels and total infiltration of fiber bundles with polymer films each have proven to be significant barriers to the production of high quality uniformly impregnated prepregs.

U.S. Pat. No. 4,735,858 to Hosokawa et al discloses a prepreg which is heat resistant. The prepreg is obtained by impregnating a heat-resistant substrate with a heat-resistant mixture as a matrix, and subjecting the resulting impregnated product to heat. The substrate may be of liquid crystal fibers, carbon fibers, inorganic fibers, metallic fibers, and mixed fibers thereof. The substrate may be in the form of threads, non-woven fabrics, woven fibers and papers. The heat-resistant mixture is formed by dissolving component materials in solvent, and is impregnated into the substrate by conventional methods.

U.S. Pat. No. 4,211,818 to Ackley discloses composite strands of resin, carbon and resin sheets reinforced by glass and carbon strands. The composite strands are wetted by resin in a bath and formed by passing the strands through a die as they emerge from the bath to control their resin content.

As an alternative to using solvents, fluidized beds may be provided. Fluidized beds permit the suspension and maintenance of solid material in a finely divided form in a state of turbulent motion in a stream of gas. The surface activity of the particles is increased by fluidizing. However, the particles are merely coated onto a surface of an article, and are unable to penetrate within the article.

The above methods of impregnation require impregnation by liquids for preparation, or merely coat an article. However, the use of liquids has proven to be undesirable, especially with impregnating materials which are insoluble in any solvent or insoluble in few solvents. Further, fluidized beds are incapable of impregnating materials into an article. Accordingly, it is desirable to provide a method and apparatus for impregnating materials which do not require liquids for their operation.

SUMMARY OF THE INVENTION

The present invention overcomes the above and other shortcomings of the prior art by providing a method and apparatus for the production of prepregs. In particular, stranded material such as fiber bundles may be impregnated with powder material. A method of impregnation of fiber bundles includes the expansion of the fiber bundles, thereby permitting powder to penetrate therewithin; and subsequently contracting the expanded fiber bundles to produce the impregnated product. An apparatus is provided containing a feeder for introducing fiber bundles such as fiber tow bundles into a chamber, and a powder feeder for feeding powder material into the chamber, wherein the fiber bundle is expanded within the chamber and penetrated by the powder, and thereafter the fiber bundle is contracted to hold the powder in place.

BRIEF DESCRIPTION OF THE DRAWING

A more complete understanding of the invention may be obtained by reference to FIG. 1 which is a schematic illustration of an apparatus of the invention for impregnating stranded material with powder.

DETAILED DESCRIPTION OF THE PREFERRED EMBODIMENTS

Figure 1:
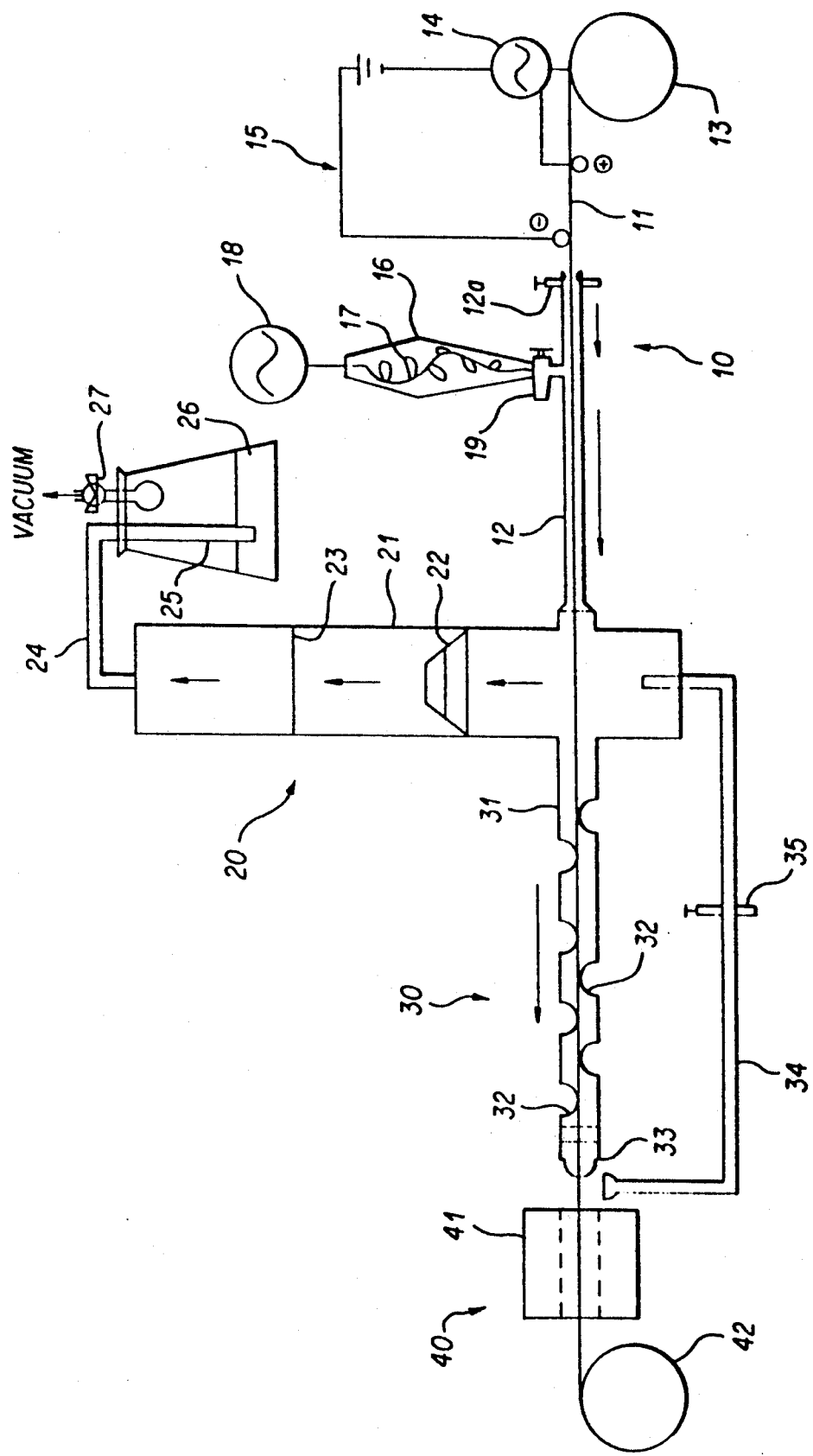

The present invention provides a solventless system for impregnating dry powder into fiber bundles. An apparatus is provided in which a fiber bundle and powder are fed into a chamber wherein the fiber bundle is caused to spread, thereby allowing the powder to disperse within the fiber bundle. The powder material is preferably agitated within and/or upon entry into the chamber. The fiber bundle is thereafter allowed to contract to hold the powder in place. An optional combing device may be provided for combing particles into the fiber bundle. The impregnated fiber bundle may then be passed through an oven to prepare a prepreg. Powder material which does not impregnate the fiber bundle may be collected and reused, if desired.

FIG. 1 shows a schematic illustration of an apparatus for carrying out the process of the invention. The apparatus essentially comprises four sections: a feed and impregnation section 10 for feeding a fiber bundle and powder into a chamber and initiating impregnation of the powder into the fiber bundle; a vacuum/powder collection section 20 for removing excess powder and for providing a vacuum; a combing section 30 for combing particles into the fiber bundle; and a finishing section 40 for processing the impregnated fiber bundle. In describing the apparatus and method of the invention, reference will be made to fiber bundles for convenience, but may comprise any stranded material.

Any fiber bundle material may be impregnated with powder materials according to the method and apparatus of the present invention. Fiber bundle materials which are loosely stranded allow for easier penetration of the powder therein. Tightly wound fiber bundles are more difficult to impregnate with powder. Any size diameter fiber which is stranded so that the powder material is able to penetrate therein may be used. Examples of fiber bundles include fine fiber of wire, cloth, graphite, glass and the like.

The components of the apparatus of the invention allow for the feeding of a fiber bundle and powder into a chamber. Within the chamber, a vacuum pulls the powder and the fiber bundle in the same direction. Air is permitted to enter the chamber in an expanding manner, and the influx of air causes the strands of fiber to expand and separate, permitting the powder to penetrate within the bundle. In other words, air enters the chamber whereupon the air expands. The expansion of the air also causes the fiber bundle to expand. This expansion permits the particles to penetrate within the bundle. Subsequently, the fiber bundle retracts to its original state, thereby holding the particles in place within the fiber bundle. Larger particles of the powder which do not fully penetrate the fiber bundle may, if desired, be assisted into the bundle by a combing section. Upon exiting the combing section, the fiber bundle may be constricted to help hold the powder in place. An oven may be provided after the combing section for curing or partially curing the impregnated fiber bundle. Powder which is not impregnated into the fiber bundle may be collected with the assistance of a venturi and the vacuum.

The feeding section 10 may be divided into two components: a fiber bundle feeder and a powder feeder. The fiber bundle feeder feeds a fiber bundle 11 to a chamber 12. The fiber bundle may be fed from a spool 13 or other source by a manual or power source such as an electric motor 14. For example, a motor circuit 15 may be arranged for continuously feeding the fiber bundle 11 into the chamber 12. If a conductive fiber bundle is utilized, the motor circuit 15 may be completed when the fiber bundle is pulled against the electrodes causing the motor to advance until the circuit is broken again, i.e., an electric dancer. The fiber bundle 11 is pulled into the chamber 12 by the vacuum, preferably while keeping a slight tension on the fiber bundle by the motor. The motor feeds the fiber bundle from the spool 13 at a rate substantially equal to the rate at which the fiber bundle is pulled into the chamber by the vacuum. Thus, the fiber bundle 11 is drawn into the chamber 12 in a steady stream. If the fiber bundle 11 should be become slack, the circuit 15 would be broken, thereby causing the motor to cease feeding the fiber bundle. Alternatively, mechanical feeding of the fiber bundle 11 may be accomplished, especially when using fiber bundles which are not electrically conductive.

The chamber 12 is preferably provided with a die 12a at the entrance thereof. Die 12a, which may be made of latex rubber or the like, is preferably constructed to permit the fiber bundle to pass therethrough with little, if any, tension on the fiber bundle. The die 12a permits the passage of the fiber bundle 11 into the chamber 12 with little or no air passing therethrough. The die 12a is provided with a mechanism such as a pinch clamp which also allows air intake into the chamber 12 to be regulated, preferably to a minimum.

The fiber bundle may be fed continuously into the chamber 12, but is preferably fed while keeping some tension on the fiber bundle. It should be noted, however, that as the tension on the fiber bundle increases, it becomes more difficult for the powder to penetrate. Tension may further increase as the length of the chambers 12 and 31 is increased.

The speed that the fiber bundle is fed into the chambers 12 and 31 may be any speed which permits the desired impregnation of the fiber bundle. Slower speeds will permit more powder to impregnate the fiber bundle since the bundle remains in the apparatus longer, whereas faster speeds will decrease the amount of powder impregnated into the fiber bundle since the time in the apparatus is reduced. For example, the fiber bundle may pass through the apparatus at about 18 ft./min. Likewise, the length of the tubes 12 and 31 will affect the amount of fiber bundle impregnated by powder, i.e., longer lengths will permit more time for the fiber bundle to become impregnated. However, increases in length may further increase tension of the fiber bundle which will further inhibit impregnation.

The powder feeder may comprise a powder feed chamber 16 having a stirrer 17 driven by stirrer motor 18. The stirrer 17 keeps powder material from becoming clogged within the powder feed chamber 16. The stirrer may be any means which will keep the feeder from becoming clogged, such as a moving wire. The powder feed chamber 16 is further provided with a powder regulator 19 which regulates the flow of powder material and air into the chamber 12. Of course, the feeding of powder and air may be accomplished separately, if desired. The powder feeder is constructed so that air and powder enter the chamber in a manner in which the air expands upon entering the chamber 12. Since the air and powder mixture expands upon entry into the chamber, the fiber bundle 11 is also caused to expand. The expansion of the fiber bundle permits the powder in the expanding air to penetrate the fiber bundle.

The powder material may be any desired powder, for example polymer powder materials, paints, dyes, and insulating materials. The present invention is especially suited for low solubility, high melt flow polymer powder materials used to produce composite prepregs such as, for example polyimides. Any powder material may be used in the present invention including, for example, polymers and metals, provided that the material is available in a powder form having particle sizes permitting the flow of particles in air within the chamber.

Typical powder material may be a dry powder having particle sizes ranging from, for example, about 30 microns or less in diameter. By dry powder, it is meant powder not suspended in a liquid carrier. For example, the powder may have an average diameter of about 10 microns. Of course, the selection of particle size will depend on factors such as the type of fiber bundle, the desired amount of impregnation, etc.

The vacuum/powder collection section 20 is provided for removing excess powder and for providing a vacuum to the system. A chamber 21 is provided with a venturi 22. As the air and powder mixture enters the chamber 21, the direction of air flow is changed. Further, the fiber bundle begins to retract to its original form upon entering the chamber 21. Smaller particles which have not impregnated the fiber bundle are accelerated through the venturi 22 and then dispersed through a filter 23 which causes an overall loss of energy in the powder. This loss of energy causes the powder to either collect at the bottom of the chamber 21 in the case of larger particles, or to pass through the pipe 24 at a reduced velocity and be collected by a bubbler 25 immersed in a liquid 26 in the case of smaller particles. A fine filter 27 is provided for final protection of the vacuum system from extremely small particles.

Large particles entering the chamber 21 may have sufficient kinetic energy to allow them to pass to the combing section 30. The reason the kinetic energy of the particle can carry it forward to the combing section 30 is that the chamber 12 extends into the combing section 30. This causes the air to make a 180 degree turn, which the powder is unable to make, causing the powder to go forward into the combing section 30. The combing section 30 of the apparatus of the present invention may be provided for combing these larger particles of the powder into the fiber bundle 11. The combing section 30 may comprise a tube 31 provided with inward projections 32 such as dimples or rollers. The projections may extend to about 50% of the diameter of the tube 31. The particular length of extension of the projections into the tube 31 as well as the arrangement of the projections are not critical, provided any desired function of combing particles into the fiber bundle is achieved. The projections 32 help to comb larger particles of the powder into the fiber bundle 11.

A die 33 may be provided at the end of the tube 31 to constrict the fiber 11 for final entrapment of the powder. The die 33 may further prevent air from entering the system at this point. The die 33 may function in a manner much like that of the die 12a for preventing or minimizing the entry of air. Accordingly, the die 33 may comprise latex rubber or other suitable material. Excess powder which is stripped from the fiber bundle outside the tube 31 and die 33 may be collected in a pipe 34 and accelerated through the venturi 22. These particles will be collected at the bottom of the chamber 21 in the case of large particles or in the liquid 26 in the case of smaller particles, as described above. The recycling of these collected particles through pipe 34 also allows the particles to be passed by the fiber bundle 11, where they may become impregnated in the fiber. The pipe 34 is provided with a pinch clamp 35 for regulating air flow.

The finishing section 40 may be provided with a heating mechanism 41, such as a convection, laser, microwave or the like oven, which may be used to cure or partially cure the powder material in the fiber bundle. The heating mechanism is optional, and other finishing operations may be performed in its place. For example, a wrapping mechanism may be provided for wrapping the impregnated fiber by a suitable wrapping material. After exiting the heater or other finishing mechanism, the impregnated fiber bundle is collected, for example by being wound on a receiving spool 42.

The heater 41 may heat the impregnated fiber to a temperature sufficient to cure or partially cure the powder material. The impregnated material may be heated to completely fuse the material in the fiber bundle, or may be heated partially to merely tack the material. Thus, depending on the type of material utilized, the temperature of the heater will vary accordingly.

In the process of making an impregnated fiber bundle of the invention, the fiber bundle 11 is fed off its spool 13 by the electric motor 14. The fiber bundle 11 is then pulled through the die 12a and through chamber 12 with air drawn in by the vacuum system through the powder feeder. Powder from the powder feed chamber 16 is mechanically dispensed and at the same time pulled by the vacuum into the chamber 12. While the incoming air is expanding within the chamber 12, the fiber bundle also expands, and the powder material is mixed into the expanded fiber bundle. The larger particles of the powder are carried into the larger chamber 31 and are combed into the fiber bundle, whereas smaller particles are carried and accelerated through the venturi 22.

At the entrance of the chamber 31 of the combing section 30, the vacuum air flow changes direction and the air no longer travels with the fiber bundle. The rubber die at the end of the chamber 31 prevents the air from entering from that direction. The die also constricts the fiber bundle for the final entrapment of the powder. Excess powder which does not impregnate the fiber bundle is first accelerated through the venturi and then dispersed through the filter 23 which causes an overall loss of energy. The loss of energy causes the powder to collect at the bottom of the chamber 21 within the filter, above the filter and in the bubbler, depending on the size and velocity of the powder. Smaller particles which are not stopped or slowed by the filter 23 are collected in the liquid 26 or fine filter 27. As the impregnated fiber bundle exits the chamber 31, large particles which become stripped from the fiber bundle are collected through pipe 34 and can be drawn back into the vacuum system through pinch clamp 35. Finishing operations may be formed on the exiting impregnated fiber bundle, if desired.

While the invention has been described with reference to particular preferred embodiments, the invention is not limited to the specific examples given, and other embodiments and modifications can be made by those skilled in the art without departing from the spirit and scope of the invention.

What is claimed is:

1. An apparatus for making a powder impregnated fiber bundle, comprising:
   a chamber;
   first means for feeding a fiber bundle into said chamber; second means for feeding dry powder into said chamber and for expanding said fiber bundle with air and impregnating said fiber bundle with said powder within said chamber;
   wherein said second means comprises a vacuum source for applying vacuum to said chamber, an air inlet for providing air to said chamber and a powder source for providing said powder to said chamber; and
   wherein said powder source is also said air inlet.

2. The apparatus of claim 1, further comprising means for constricting said impregnated fiber bundle.

3. The apparatus of claim 1, further comprising a powder collecting system for collecting excess powder which is not impregnated into said fiber bundle.

4. The apparatus of claim 1, further comprising combing means for combing said powder into said fiber bundle.

5. The apparatus of claim 1, further comprising combing means for combing said powder into said fiber bundle, said vacuum source being located downstream of said chamber, and said combing means being located downstream of said vacuum source.

6. The apparatus of claim 1, further comprising curing means for curing said impregnated fiber bundle.

7. The apparatus of claim 1, wherein said vacuum source assists the feeding of said fiber bundle, and the feeding and collection of said powder.

8. The apparatus of claim 7, wherein said vacuum source is located downstream of both said first means and said second means.

9. An impregnation apparatus comprising:
   an impregnation chamber;
   a stranded material feeder arranged to feed stranded material into said impregnation chamber;
   a powder feeder arranged to feed powder into said impregnation chamber; and a vacuum source arranged to apply a vacuum to said impregnation chamber downstream of said stranded material feeder and said powder feeder.

10. The apparatus of claim 9, wherein the powder feeder permits the passage of air into the impregnation chamber.

11. The apparatus of claim 9, further comprising a comb for combing large particles of said powder into said stranded material.

12. The apparatus of claim 9, wherein said stranded material feeder is a fiber bundle feeder.

13. An impregnation apparatus comprising:
an impregnation chamber;
a stranded material feeder arranged to feed stranded material into said impregnation chamber;
a powder feeder arranged to feed powder into said impregnation chamber wherein the powder feeder permits the passage of air into the impregnation chamber;
a vacuum source arranged to apply a vacuum to said impregnation chamber downstream of said stranded material feeder and said powder feeder;
a comb for combing large particles of said powder into said stranded material forming an impregnated stranded material; and an oven for curing or partially curing said impregnated stranded material.

14. A method of making impregnated stranded material, comprising expanding and impregnating said stranded material with powder and fixing said powder within said stranded material, wherein said stranded material is impregnated by a vacuum pulling said powder and said stranded material together through an impregnation chamber.

15. A method of making impregnated stranded material, comprising expanding and impregnating said stranded material with powder and fixing said powder within said stranded material, further comprising combing said powder into said stranded material.

* * * * *